United States Patent
Atkins et al.

(10) Patent No.: US 10,334,357 B2
(45) Date of Patent: Jun. 25, 2019

(54) MACHINE LEARNING BASED SOUND FIELD ANALYSIS

(71) Applicant: Apple Inc., Cupertino, CA (US)

(72) Inventors: Joshua D. Atkins, Los Angeles, CA (US); Mehrez Souden, Los Angeles, CA (US); Symeon Delikaris-Manias, Helsinki (FI); Peter Raffensperger, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/721,644

(22) Filed: Sep. 29, 2017

(65) Prior Publication Data
US 2019/0104357 A1    Apr. 4, 2019

(51) Int. Cl.
*H04R 1/40*    (2006.01)
*G06N 3/08*    (2006.01)
*G06F 16/61*    (2019.01)

(52) U.S. Cl.
CPC ............ *H04R 1/406* (2013.01); *G06F 16/61* (2019.01); *G06N 3/08* (2013.01); *H04S 2400/01* (2013.01); *H04S 2400/15* (2013.01)

(58) Field of Classification Search
None
See application file for complete search history.

(56) References Cited

U.S. PATENT DOCUMENTS

| 9,451,379 B2 | 9/2016 | Gunawan et al. |
| 2002/0116196 A1 | 8/2002 | Tran |
| 2006/0171547 A1* | 8/2006 | Lokki ................ H04S 7/30 381/92 |
| 2016/0073198 A1 | 3/2016 | Vilermo et al. |

OTHER PUBLICATIONS

Czyzewski, Andrzej. Automatic identification of sound source position employing neural networks and rough sets. 2002, pp. 921-933.*
Chandran, Sathish, and Mohammad K. Ibrahim. "DOA estimation of wide-band signals based on time-frequency analysis." IEEE Journal of Oceanic Engineering, vol. 24, No. 1, Jan. 1999, pp. 116-121.*
Pertila, Pasi, and Emre Cakir. "Robust direction estimation with convolutional neural networks-based steered response power." IEEE 42nd ICASSP, Mar. 2017.*
DiBiase, Joseph H., et al., "Robust Localization in Reverberant Rooms", Microphone Arrays: Signal Processing Techniques and Applications, 2001, pp. 157-180.

(Continued)

*Primary Examiner* — James K Mooney
(74) *Attorney, Agent, or Firm* — Womble Bond Dickinson (US) LLP

(57) ABSTRACT

Impulse responses of a device are measured. A database of sound files is generated by convolving source signals with the impulse responses of the device. The sound files from the database are transformed into time-frequency domain. One or more sub-band directional features is estimated at each sub-band of the time-frequency domain. A deep neural network (DNN) is trained for each sub-band based on the estimated one or more sub-band directional features and a target directional feature.

27 Claims, 9 Drawing Sheets

(56) References Cited

OTHER PUBLICATIONS

Ma, N., et al., "Speech localisation in a multitalker mixture by humans and machines", Proceedings of Interspeech, Sep. 8, 2016, pp. 3359-3363.
Chakrabarty, Soumitro, et al., "Broadband DOA Estimation Using Convolutional Neural Networks Trained With Noise Signals", IEEE Workshop on Applications of Signal Processing to Audio and Acoustics (WASPAA), May 2, 2017, 5 pages.
Zheng, W.Q., et al., "Spectral Mask Estimation Using Deep Neural Networks for Inter-Sensor Data Ratio Model Based Robust DOA Estimation", IEEE International Conference on Acoustics, Speech, and Signal Processing (ICASSP), Apr. 19, 2015, 325-329.

* cited by examiner

MACHINE LEARNING BASED SOUND FIELD ANALYSIS

FIELD

The disclosure herein relates to sound field analysis, and in particular to machine based learning for sound field analysis.

BACKGROUND

A number of applications in multichannel audio require accurate sound field analysis such as multichannel speech enhancement for telephony, multichannel speech enhancement for robust automatic speech recognition (ASR), and spatial sound reproduction. However, device geometry and the number of microphones included in the device can limit the performance of conventional digital signal processing (DSP) algorithms for sound field analysis. Traditional multi-source localization often does not perform consistently well for arbitrary microphone arrays.

As part of DSP for sound field analysis, conventional techniques may calculate a direction of arrival (DOA) which denotes the direction from which a propagating wave arrives at the microphone array. However, DOA typically cannot be resolved above spatial aliasing frequencies using traditional DSP methods, and typically cannot be resolved at low frequencies due to acoustic noise and low spatial resolution.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. Also, in the interest of conciseness and reducing the total number of figures, a given figure may be used to illustrate the features of more than one embodiment, and not all elements in the figure may be required for a given embodiment.

DETAILED DESCRIPTION

Several embodiments of the invention with reference to the appended drawings are now explained. Whenever aspects are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Generally, an embodiment herein aims to obtain an efficient and accurate sound field analysis, using a trained deep neural network (DNN), for reproduction on a speaker system or other device. In one embodiment, impulse responses of a device are measured, and a database of sound files is generated by convolving source signals with the impulse responses of the device. The sound files from the database are transformed into time-frequency domain. One or more sub-band directional features are estimated at each sub-band of the time-frequency domain. The one or more sub-band directional features may include a Steered-Response Power Phase Transform (SRP-PHAT), inter-microphone phase differences, and/or diffuseness. A deep neural network (DNN) is trained for each sub-band based on the estimated one or more sub-band directional features and a target directional feature. In one embodiment, the DNN is trained with single or multi-source audio signals utilizing real microphone array recordings, where the target direction feature includes a direction of arrival (DOA) of the single or multi-source audio signals. This training enables the DNN to learn the mapping of an interaction of the audio signals with physical features of the device and acoustic environment to a respective direction of arrival (DOA) of the target directional feature. In another embodiment, the DNN is trained with single and multi-source audio signals utilizing real microphone array recordings, where the target directional feature includes directions of arrival (DOAs) of the simultaneously active single and multi-source audio signals. This training enables the DNN to learn the mapping of an interaction of the audio signals with physical features of the device and acoustic environment to simultaneously active source locations.

Figure 1:
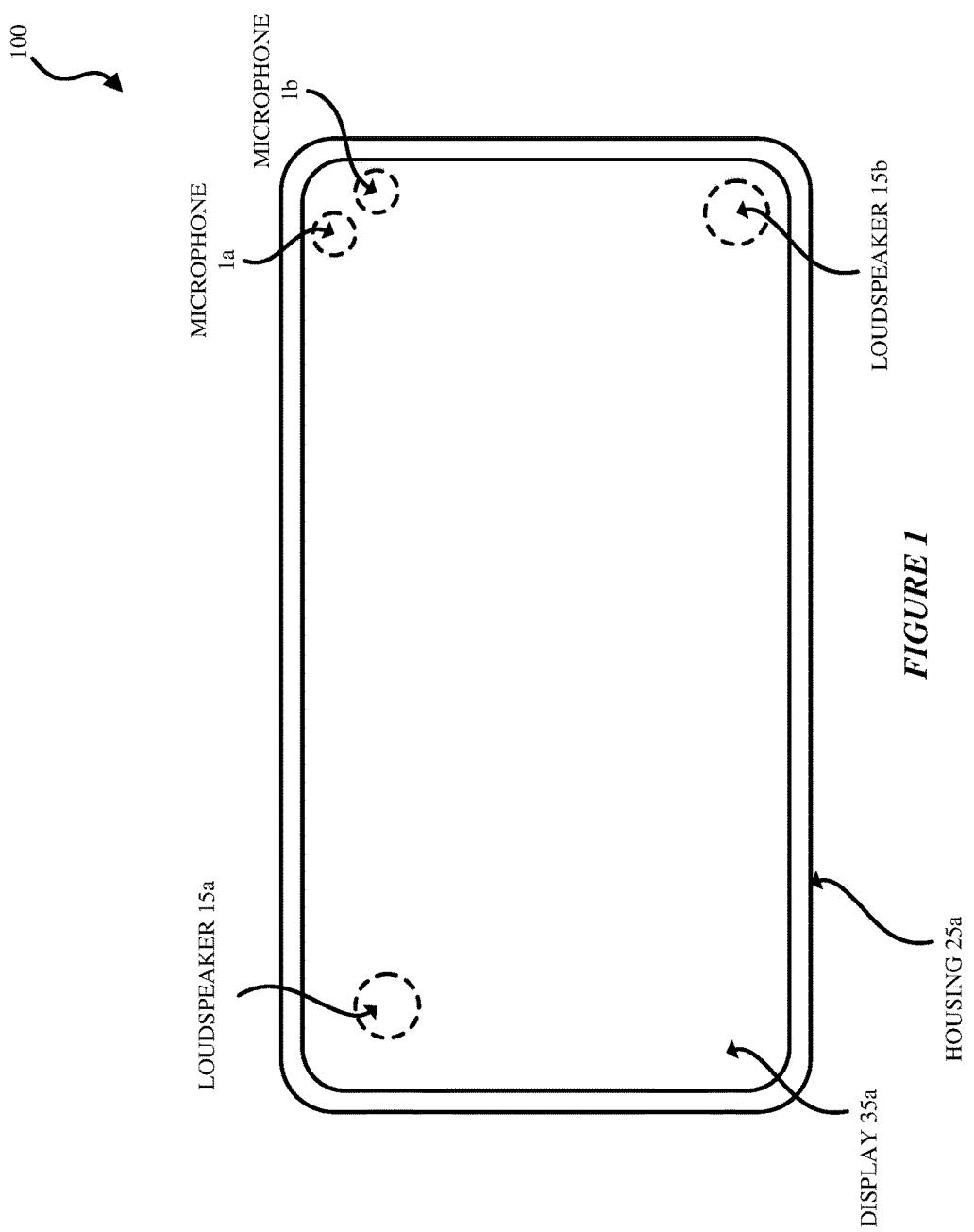
FIG. 1 illustrates an example for explaining a portable device including a microphone array according to an example embodiment.

FIG. 1 illustrates an example for discussing a portable device including a microphone array according to a first example embodiment. Portable device 100 may be any electronic device that includes two or more microphones (e.g., a microphone array), such as a tablet computer or a mobile phone handset. Device 100 is portable and thus can be easily handled, positioned and moved by the user. Device 100 can also operate in many different environments. The housing 25a of device 100 contains a number of microphones 1 (two microphones 1a and 1b are illustrated in FIG. 1). In one embodiment, the housing of the device 100 may also contain one or more loudspeakers 15 (two loudspeakers 15a and 15b are illustrated in FIG. 1). In general, microphones 1 are used to pick up signals from sound sources in the environment in and around the device 100. The loudspeakers 15 are used to play back signals from sound sources outside the surrounding environment. Display 35a displays images captured by a camera. In one embodiment, display 35a displays an interface generated to instruct a user on device placement.

Microphones 1 (or individually, microphones 1a, 1b,) may be integrated within the housing 25a of the device 100, and may have a fixed geometrical relationship to each other. In the example depicted in FIG. 1, the microphones can be positioned on different surfaces, e.g. microphone 1a can be on the front (screen) surface of the device and microphone 1b may be on the back surface of the device. This is just one example arrangement; however it should be understood that other arrangements of microphones that may be viewed collectively as a microphone array whose geometrical relationship may be fixed and "known" at the time of manufacture are possible, e.g. arrangements of two or more microphones in the housing of a mobile electronic device (e.g., mobile phone) or a computer (e.g., a tablet computer). Another example arrangement is discussed in connection with FIG. 2.

In one embodiment, beamforming may also be applied to the microphone signals. The signals from the microphones 1 are digitized, and made available simultaneously or parallel in time, to a digital processor (e.g., processor 902 of FIG. 9) that can utilize any suitable combination of the microphone signals in order to produce a number of acoustic pick up beams. The microphones 1 including their individual sensitivities and directivities may be known and considered when configuring or defining each of the beams, such that the microphones 1 are treated as a microphone array.

Figure 2:
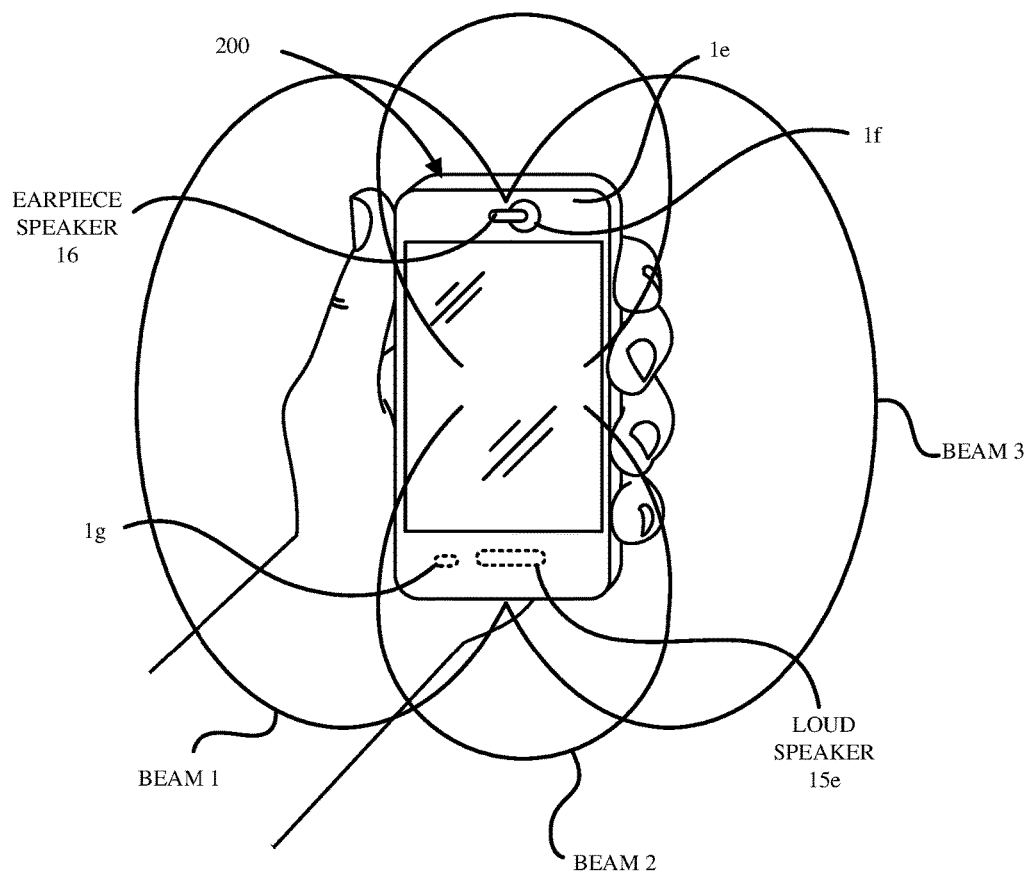
FIG. 2 illustrates a mobile phone hand set for explaining an example portable device, overlaid with some example beams, according to an example embodiment.

FIG. 2 illustrates another example of a portable device with some example beams (beam 1, beam 2, beam 3). In the example of FIG. 2, the portable device is implemented as a mobile phone handset 200 having three microphones integrated within the housing, namely a bottom microphone 1g and two top microphones 1e, 1f. The microphone 1e may be referred to as a top reference microphone whose sound sensitive surface is open on the rear face of the handset, while the microphone 1f has its sound sensitive surface open to the front and is located adjacent to an earpiece speaker 16. The handset also has a loudspeaker 15e located closer to the bottom microphone 1g as shown. The handset also includes a display. In the embodiment of FIG. 2, microphones 1e, 1f and 1g have a fixed geometrical relationship to each other. The mobile phone handset 200 may use any one or more of three microphones 1e, 1f, 1g to produce one or more respective microphone signals that are used to produce one or more acoustic pick up beams. Although FIG. 2 shows three microphones integrated within the housing of the portable device, in other embodiments, other numbers of microphones are possible, such as four or more. Other arrangements of microphones that may be viewed collectively as a microphone array or cluster whose geometrical relationship may be fixed and "known" at the time of manufacture are possible, e.g. arrangements of two or more microphones in the housing of a computer (e.g., a tablet computer).

Three example beams are depicted in FIG. 2 (namely, beam 1, beam 2, beam 3), which may be produced using a combination of at least two microphones, for example the bottom microphone 1g and the top reference microphone 1e. In one embodiment, each audio channel or "beam" can be defined as a linear combination of the raw signals available from the multiple microphones. The beams may be computed as a combination (e.g. weighted sum) of two or more microphone signals from two or more of the microphones. More generally, the weighting can be implemented by a linear filter, where different filters run on the two microphones before the outputs are summed to produce a beam. Various beams of other shapes and using other combinations of the microphones (including ones that are not shown) are possible.

In the embodiments of FIGS. 1 and 2, all of the processing is performed by the portable device 100. However, in other embodiments, the portable device can be communicatively coupled to a processing device (not shown), either wirelessly or via a wire. The processing device may perform some or all of the processing.

Figure 3:
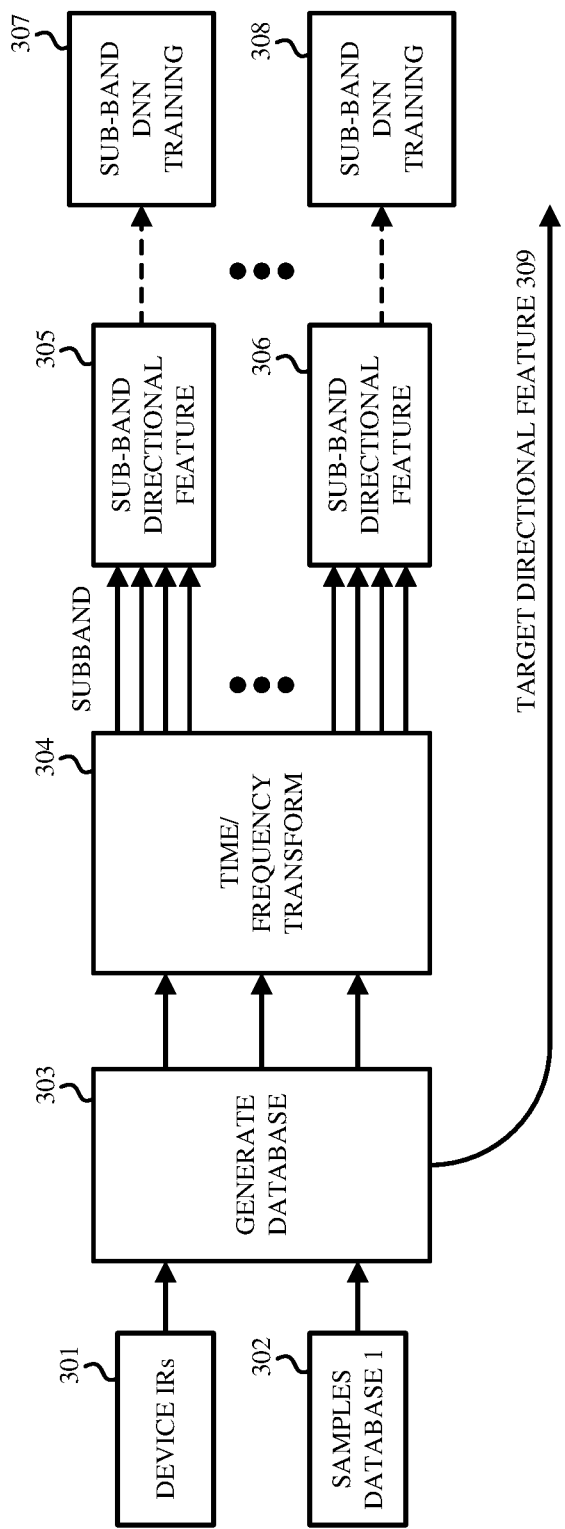
FIG. 3 is a block diagram for explaining training a deep neural network (DNN) to be used in sound field analysis according to an example embodiment.

FIG. 3 is a block diagram for explaining training of a deep neural network (DNN) to be used in sound field analysis, using a database sound files, according to an example embodiment. As illustrated in FIG. 3, impulse responses of a device (e.g., portable device 100 or portable device 200) (301) are provided to generate a database of sound files (303). The impulse responses of the device can be measured in anechoic environment, in a reverberant environment or simulated. The measurement grid may be a dense spherical grid. Also, provided to generate the database are sound source signals (302) such as music, speech, noise, etc. In one embodiment, the database of sound files is generated (303) by convolving the source signals with the measured impulse responses of the hardware of the device of interest. All of the sound files from the database are transformed into the time-frequency domain (304). Sub-band directional features are then estimated at each sub-band of the time-frequency domain (305 and 306). A separate DNN is trained for each sub-band given the input sub-band directional features (307 and 308) and a target directional feature (309) such as a direction of arrival (DOA) that is provided from the database.

The embodiment depicted in FIG. 3 can provide a deep learning method for instantaneous sub-band direction of arrival estimation, which is described in more detail below. Input features for the sub-band directional features can be common spatial coherence measures such as SRP-PHAT spectrum and inter-channel covariance. Output features can be directional class labels, with, for example, one class per direction. In one embodiment, the DNN is trained with single or multi-source audio signals utilizing real microphone array recordings, where the target direction feature includes a direction of arrival (DOA) of the single or multi-source audio signals. This training enables the DNN to learn the mapping of an interaction of the audio signals with physical features of the device and acoustic environment to a respective direction of arrival (DOA) of the target directional feature. Each sub-band may be treated independently with a separate DNN. In another embodiment, the DNN is trained with single and multi-source audio signals utilizing real microphone array recordings, where the target directional feature includes directions of arrival (DOAs) of the simultaneously active single and multi-source audio signals. This training enables the DNN to learn the mapping of an interaction of the audio signals with physical features of the device and acoustic environment to simultaneously active source locations The inventors herein have found that localization can be affected at the higher frequencies by the fact that the beam patterns can be aliased in a way that is similar to time domain sampling. For example, in time domain sampling, if sampling is performed slower than necessary, this can result in different signals capable of mapping to the sampling rate. However, if sampling is performed faster, a better reconstruction of the signal with less ambiguity results. This can be analogous to space sampling. In space sampling, if there are, for example, two microphones (samples or beams) and they are far apart, calculating the spectrum from these microphones might also run into the ambiguity of different signals which can map to the space sampling. However, if the microphones are positioned closer together, a better sample of the space might be provided.

In one embodiment, to perform a direction estimation, a time of arrival is used. A sound wave front hits one microphone before another microphone resulting in a time difference. Based on the time difference and knowledge of the spacing of the microphones, it is possible to calculate an angle. The inventors have found two potential problems with the foregoing. If the microphones are placed very close together, no aliasing results since there is no anomaly within the speech frequency ranges. This depends on the wavelength of interest for estimating the direction. For purposes of the disclosure herein, a full band from 20 Hz to 20 KHz is of interest. Generally, a small spacing between microphones is better for high frequencies. However, if the microphones are too close together, resolution can be lost at the lower frequencies.

Using the physics of the device can help to exploit machine learning. In particular, the way sound interacts with the device can cause a certain acoustic signature (direct path and sound diffraction) for that particular device for a given sound direction. This diffraction is the interaction of sound with the device at that particular frequency and impinging from a certain direction. The diffraction can be measured and with prior knowledge of how a particular frequency interacts with that device, the system is trained to look at other features that are particular to the device (which do not just take into account the microphone spacing).

In one embodiment, the device is characterized by taking measurements on the device. Based on those measurements and response of the device to signals that come from different directions, mapping can be performed back to a situation, for example, after training a certain system. If the system is placed into a test session, mapping can be performed back to one of those locations with new test data.

As described above, provided in an embodiment herein is a deep neural network based solution which addresses the alias problem using a more sophisticated method which is deep learning. The deep learning will learn the specific pattern when the sources come from a certain direction. The spatial spectrum (pattern) can be determined by the measured impulse responses.

When determining DOA using SRP-PHAT, a probability is compared to the angle over a window of time. The highest probability is then chosen at the peak of the function of probability versus angle to determine the DOA. In some situations, there can be two peaks in a mirrored image. In these situations, there are typically not two sources at exactly those positions. However, from the perspective of the feature that is used to determine the DOA at that frequency, there might be a pattern having two peaks of a single source coming from one of the peaks (direction). Alternatively, instead of producing probabilities at discrete locations, the DNN may be designed and trained to produce the XYZ Cartesian coordinates that correspond to the target DOA.

The embodiments described herein can provide a system that can incorporate knowledge of multiple different acoustic conditions and multiple different devices into the determination of the DOA, such that the system can work on different hardware platforms. For a particular frequency in the anechoic chamber, the probability of a source coming from a specific direction can come from this irregular shape (e.g., below aliasing the peak is very clear with one peak, and above aliasing there are patterns with multiple peaks). In the latter case, it is difficult to discern between the two peaks or the signal may bounce back and forth between peaks over time.

In contrast to conventional methods which perform DOA estimation for a full band, the embodiments described herein aim to perform a DOA estimation for every time-frequency bin independently. For DOA estimation for full band, the process is simple. Frequencies that work well for the full band are determined, and estimates at these frequencies are used to discern the full band direction of arrival. However, this is an average across frequencies which is not very granular so it does not work well to capture multiple sources that occupy different parts of the spectral content of the audio signal. This method is therefore not sufficient to localize multiple sources. In contrast, the embodiments herein aim to capture the acoustic scene in all directions for all audio sources in a given acoustic scene of interest, not just speech sources. To do this, each sub-band in the range from 20 Hz to 20 KHz is treated independently.

As one example of using the complexity of analyzing an acoustic scene, if two people are speaking at the same time, it is possible to tell which person is speaking. Because their spectra or energy distribution of their speech signals are not completely overlapped in the frequency domain, they are in different frequencies. It is assumed that the time is divided into small segments (e.g., a few tens of milliseconds) and FFT and analysis are performed per frequency bin on the small audio segments. For those particular frequency bins, since each bin is operated on separately, each has different characteristics. The energy of one of the two people is not present in a frequency bin, while the other person's energy will be present in the frequency bin. When the analysis is performed, the spectra can be seen. Pathological cases may exist with very similar vocal characteristics and when the two people say the exact same thing at the same time. In these cases, the energy may potentially be overlapping at the exact same time frequencies. Because people typically say different things and have different vocal characteristics, it's very rare for a time frequency bin to be jointly dominated by both speakers. Therefore, a given bin is typically dominated by one source. This generalizes to audio sources other than speech.

Referring back to FIG. 3, in one embodiment, each time frequency bin for each sub-band receives an instantaneous DOA estimate that is independent of the other bins. The instantaneous DOA estimate is obtained rather than a smoothed out estimate because the active sources are changing in a dynamic scene from one time instance to another and the DOA of the instant moment is desired, not the average over, for example, 100 ms. The system or DNN is therefore trained to, using the current time instance features based on time of arrival or some measurements of the device, predict the DOA for each time-frequency bin.

One of the sub-band features input into the DNN may include the SRP-PHAT feature. This feature calculates the energy (or spatial spectrum) at a certain number of directions to calculate the probability that the source comes from a particular direction. If there are 360 degrees around the device, and sampling is performed, for example, at a resolution of 5 degrees, there will be 72 candidate locations. Of course, other degrees of resolution may be used and the embodiments are not limited to 5 degrees. Thus, in this example, SRP-PHAT features as input features per frequency sub-band will total 72 because the probability will have 72 locations. Known techniques calculate the SRP-PHAT feature and pick the peak or the max across all angles to decide on a DOA. In embodiments described herein, the SRP-PHAT features are calculated and instead of picking a peak, a DNN predicts the probability of the angle for a different set of quantized angles. This can provide the advantage of being much more accurate than the conventional technique. For each time-frequency bin (time slice), an SRP-PHAT is calculated and the SRP-PHAT provides values of coarseness/fineness or how many degrees you are skipping around, for example, on a horizontal plane around the device. Thus, instead of just taking one of those values, all 72 values for each bin for that time slice are provided as an input feature to the DNN. Again, this can be performed for all of the time-frequency bins.

With respect to the target directional features (309) shown in FIG. 3, the number can be similar to the input features. In the example discussed above, if there are 72 inputs then there are 72 outputs and those are the angles.

In other embodiments, the number of input features can be different than the number of output features. In a case where the DNN interpolates or extrapolates, there are fewer input features than the output features. The interpolation or extrapolation is utilized based on a computational tradeoff of efficiency versus accuracy. For example, instead of having 72 output target values, more values can be utilized for more accuracy or fewer values can be utilized with extrapolation for efficiency.

In one embodiment, the DNNs are trained before the devices are shipped and they are static and do not change over time. Training of the DNNs may involve taking a device, playing a sound from a given angle and getting a sound source. This is captured on a particular device and the particular angle is documented. This is an example of training the DNN for that particular angle. This training is repeated for all angles of interest for each time-frequency bin.

In conventional methods, it is not straight forward to pick the max of the spatial spectrum for multiple source localization. Typically, the known techniques build/use heuristics for scenarios with two peaks. This approach can easily fail when something is done wrong. In the embodiments described herein, the DNN is trained to discern between one source and two peaks and two sources and two peaks. In doing so, the DNN is trained for the high frequencies and the low frequencies, decoupling the two as higher and lower. Here, the DNN is provided with input features and estimates the source. The DNN is trained to perform cleaner DOA picks. In one example, low frequencies typically have one peak and the DNN is trained to pick one point corresponding to the peak. In another example, with high frequencies there can be two peaks, so the DNN is trained to pick one point at peak for DOA. In a third example, two input sources can have multiple peaks and the DNN is trained to pick the two DOAs.

In a situation where higher resolution or 3D sound is desired, a number of input features for the DNN exponentially multiplies. It may be beneficial to have a system where the features input into the DNN are very small (low in number). The complexity of the process that uses up the CPU depends on the sizes of the first and hidden layers. Larger layers leads to larger matrix multiplies on every time frequency bin, which means more complexity.

In one embodiment, other input features for the sub-band directional features can be used that are much lower in dimensionality. These input features do not produce probability as a function of angle. Rather, these input features are indicative of the direction but not directly mapped.

In one example, using 4 microphones, when going from observed signals on the microphones to 72 features, it is possible to know the time of arrival differences between the microphones for a given angle. Then, the relative time or arrival difference between the microphones is used to find the angle that looks closest to that observed time of arrival difference and that angle is mapped as a probability.

In the above example, the relative phase (observed relative time of arrival) is fed to the DNN, being non-linearly related to the angle and dependent on the mic array. The phase to angle is not unwrapped for the DNN. Rather, the DNN is given the raw phase and it learns mapping from phase to angle for that particular device. This can provide a reduced amount of input features because, for example, with four microphones there are 6 pairs of phase differences between the microphones (e.g., 1-2, 1-3, 1-4, etc.). By virtue of the foregoing arrangement, it is possible for the DNN to infer the DOA probability by looking at the phase differences or inter-mic correlations. This can be performed for each time-frequency bin.

In one embodiment, the input feature may include diffuseness. If in a reverberant environment, and speaking, a given time frequency bin might be mostly directional energy but part of that can be reverberant and coming from many different directions at one time. Knowing the ratio of directional to diffuse signals in that time frequency bin is a useful parameter that can be used to re-synthesize the audio scene. This is diffuseness of the time-frequency bin. Reverb is one example of diffuseness. Another example is babble (e.g., loud environment). In babble, for example, the bin may be 100% diffuse coming from all angles simultaneously. Instead of trying to nitpick which is most probable direction, the time-frequency bin is determined to be mostly diffuse energy. A rendering unit (e.g., rendering unit 505 of FIG. 5) is delivered this information and does something different about how it plays back the signal.

For DNN, diffuseness can be measured and provided as an input feature to the DNN. The DNN can then use these parameters as input features to re-synthesize the audio for a different speaker or for headphones.

The diffuseness value can also be calculated for the DNN as an input feature with other features such as SRP-PHAT. Diffuseness can be estimated using a traditional technique. Based off the microphone geometry it can be assumed what a diffuse sound field looks like versus a directional one.

During training of the DNN, initial estimates of diffuseness or DOA are provided to the DNN, and the DNN predicts a more robust, more accurate estimate. The DNN can be trained to learn the interactions of all of these input features together, then it can come up with a more reliable estimate. With DNN, it is possible to combine multiple features because it is exposed to a great number of examples, and therefore learns the combination of those features. For example, the DNN may select a DOA differently based on a different diffuseness level.

In one embodiment, diffuseness can be used as an output feature as well, by using it to play back the captured audio scene. The DNN can be taught to come up with a diffuseness target value so that it is possible, when recording the training data, to know the true value of how diffuse that sound field is. Thus, with a DNN, it is possible to predict true value of the diffuseness. This is not just used as an input feature, but can also get passed onto a sound reproduction system.

Figure 4:
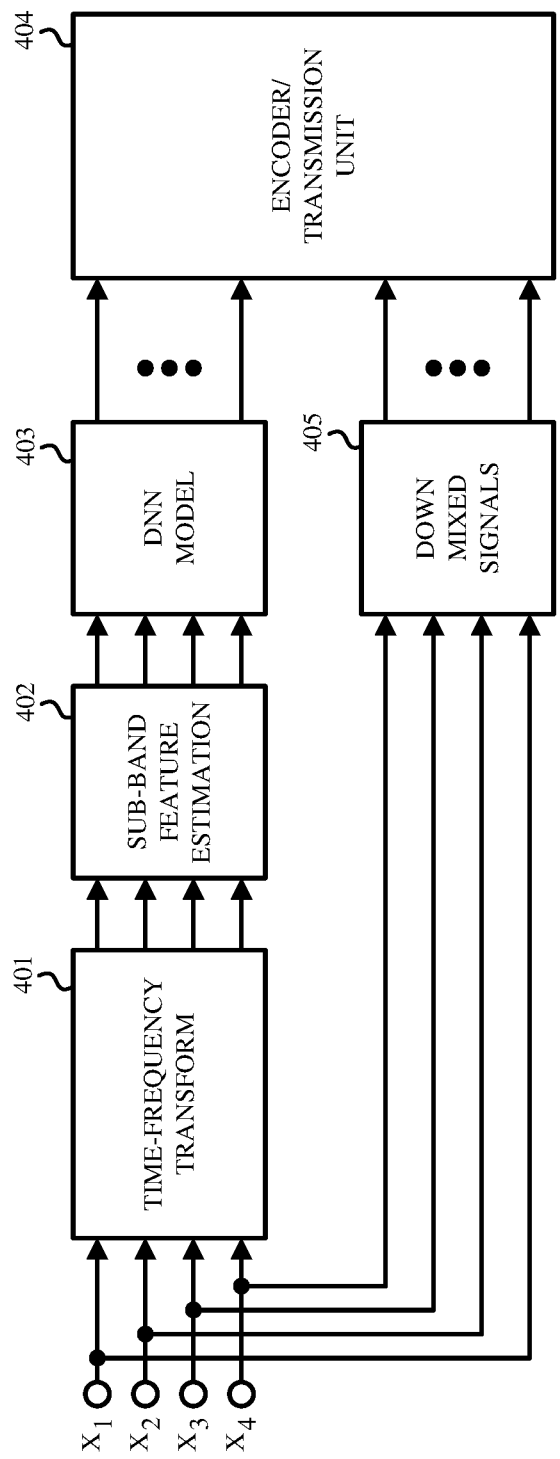
FIG. 4 is a block diagram for explaining using a trained DNN to encode a sound field into a set of parameters, according to an example embodiment.

FIG. 4 is a block diagram for explaining utilizing a trained DNN to encode a sound field into a set of parameters, according to an example embodiment. As illustrated in FIG. 4, microphone input signals (e.g., $x_1$-$x_4$) are transformed in the time-frequency domain (401). Sub-band features are estimated (402) utilizing the time-frequency representation of the microphone array signals. The estimated sub-band features are then fed into the DNN model (403). The estimated sub-band sound field descriptors produced by the DNN model 403 together with a subset or a downmixed version (405) of the microphone array input signal can be encoded and transmitted (404).

Figure 5:
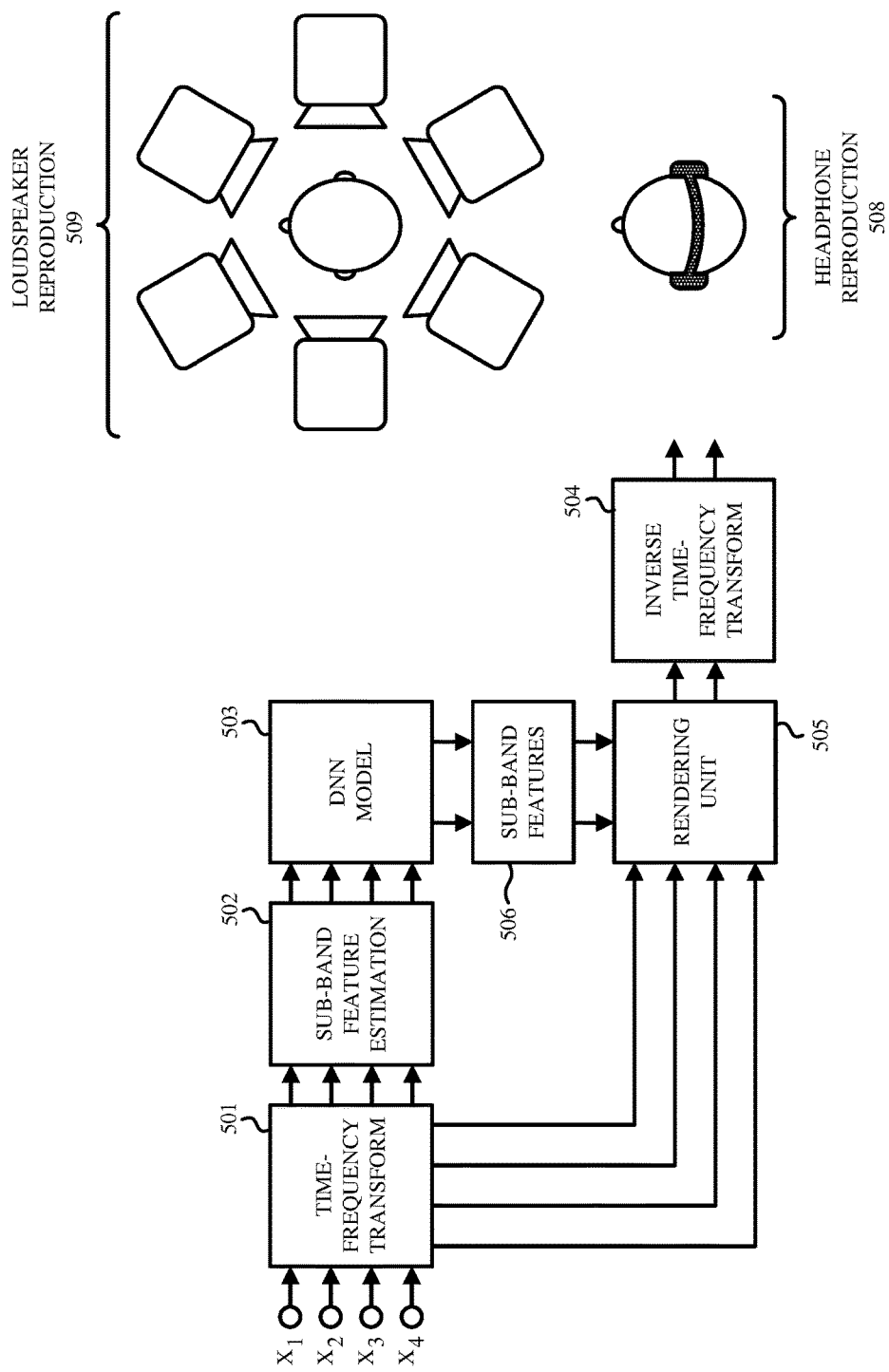
FIG. 5 is a block diagram for explaining using a trained DNN for spatial sound reproduction, according to an example embodiment.

FIG. 5 is a block diagram for explaining utilizing a trained DNN for spatial sound reproduction, according to an example embodiment. As illustrated in FIG. 5, microphone input signals (e.g., $x_1$-$x_4$) are transformed in the time-frequency domain (501). Sub-band features (502) are estimated utilizing the time-frequency representation of the microphone array signals. The estimated sub-band features are then fed into the DNN model (503). The estimated sub-band sound field parameters (506) are then fed into the rendering engine (505). The rendering engine 505 mixes all or part of the microphone array input signal with the estimate parameters to provide loudspeaker (509) or headphone (508) signals. The output signal from the rendering unit 505 are transformed back to time domain with an inverse time-frequency transform (504) and can be fed directly to headphones 508 or loudspeakers 509.

In one embodiment, when taking a video of a person, as a video recorder the user knows the person is in front of the camera, and indicates that they only want to capture audio in front of the device. In each time frequency, a mask can be built for a certain angle. If a signal is beyond outside of the certain angle, then it is attenuated by over suppressing. This is an application of the trained DNN where there is a very focused directional pickup which can be more focused than obtainable with a standard beamformer.

Figure 6:
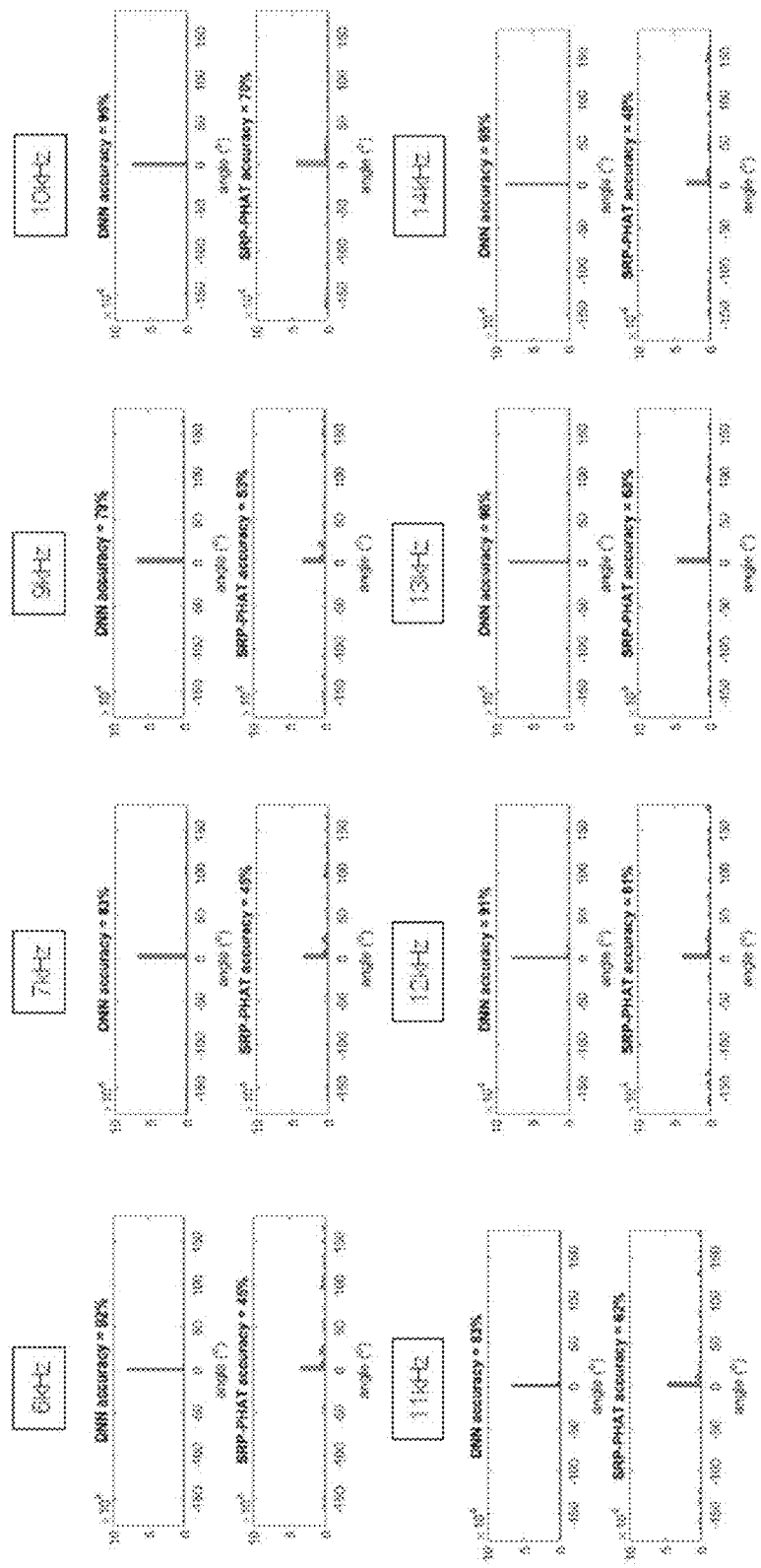
FIG. 6 shows comparison results between a conventional direction of arrival (DOA) estimator and a DNN DOA estimator according to an example embodiment.

FIG. 6 shows comparison results for a single source between a conventional direction of arrival (DOA) estimator and a DNN DOA estimator according to an example embodiment. Here, a traditional DOA estimator (SRP-PHAT) is compared with a DNN DOA estimator using SRP-PHAT spatial spectrum as input features. As shown in FIG. 6, DNN-DOA clearly outperforms SRP-PHAT at all sub-band frequencies.

Figure 7A:
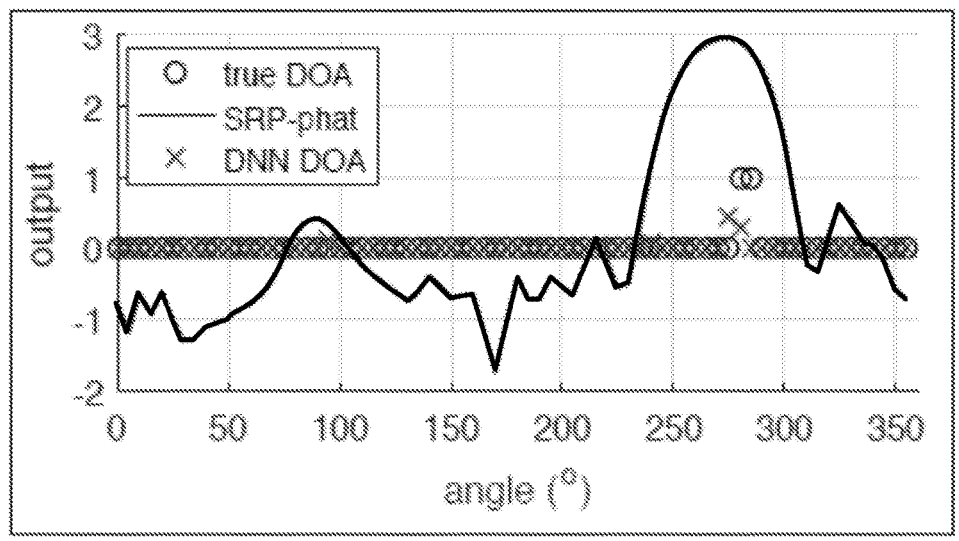
FIGS. 7A and 7B show comparison results between a Steered-Response Power Phase Transform (SRP-PHAT) method and a DNN DOA estimator according to an example embodiment.
Figure 7B:
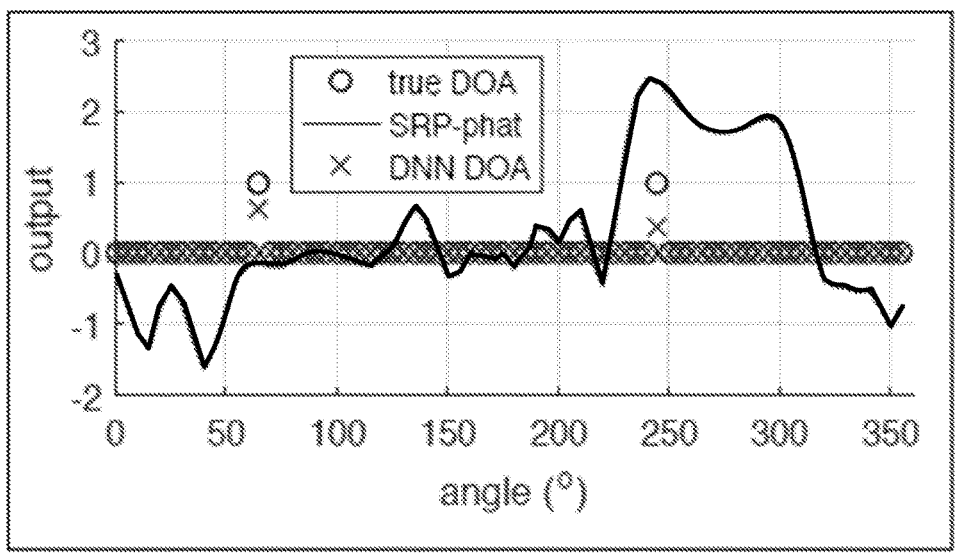

FIGS. 7A and 7B show comparison results for both single and multiple source localization between a SRP-PHAT method and a DNN DOA estimator according to an example embodiment. As evidenced by FIG. 7A, another advantage of DNN is full-band localization for multiple sources. Here, the DNN model can resolve two sources which are closely positioned. In contrast, the SRP-PHAT is unable to detect two sources in this case. As shown in FIG. 7B, the DNN model can detect a source where the SRP-PHAT does not provide any peak. This provides a good indication that the DNN approach can potentially model the complexity of the SRP-PHAT spectrum and detect the DOA accurately.

Figure 8:
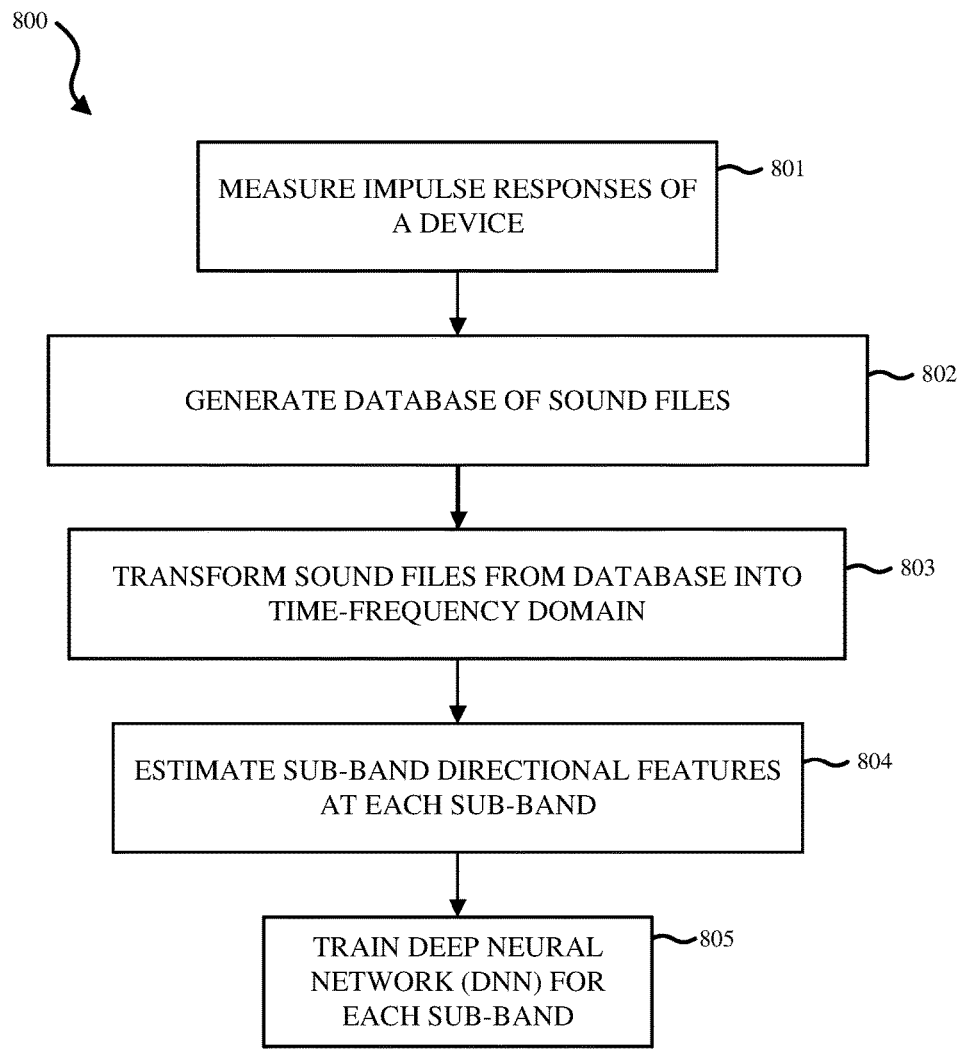
FIG. 8 is a flow chart for explaining training of a DNN according to an example embodiment.

Turning to FIG. 8, a flow diagram is illustrated for explaining training of a DNN for use in a portable device (e.g., portable device 100 of FIG. 1 or portable device 200 of FIG. 2) performing sound field analysis, according to an example embodiment. In this regard, the following embodiments may be described as a process 800, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. Process 800 may be performed by processing logic that includes hardware (e.g. circuitry, dedicated logic, etc.), software (e.g., embodied on a non-transitory computer readable medium), or a combination thereof.

In the embodiment of FIG. 8, at block 801, impulse responses of the portable device 100 are measured. At block 802, a database of sound files is generated by convolving source signals with the impulse responses of the portable device 100. At block 803, the sound files from the database are transformed into time-frequency domain. At block 804, one or more sub-band directional features are estimated at each sub-band of the time-frequency domain. The one or more sub-band directional features may include one or more of a SRP-PHAT, inter microphone phases, and diffuseness. At block 805, a deep neural network (DNN) is trained for each sub-band based on the estimated one or more sub-band directional features and a target directional feature. In one embodiment, the DNN is trained with single or multi-source audio signals utilizing real microphone array recordings so that the DNN can learn the mapping of an audio signal's interaction with physical features of the device and acoustic environment to a respective direction of arrival (DOA) of the target directional feature. In another embodiment, the DNN is trained with single and multi-source audio signals utilizing real microphone array recordings so that the DNN can learn the mapping of an audio signal's interaction with physical features of the device and acoustic environment to simultaneously active source locations.

In another embodiment, alternative sound field descriptors are defined as output classes of the DNN to learn sound field characteristics specific to hardware of interest per sub-band. According to one embodiment, the sound field descriptors include one or more of diffuseness, inter-channel (e.g., inter-microphone) level differences (ILD) and inter-channel time differences (ITD) as a function of the angle.

Figure 9:
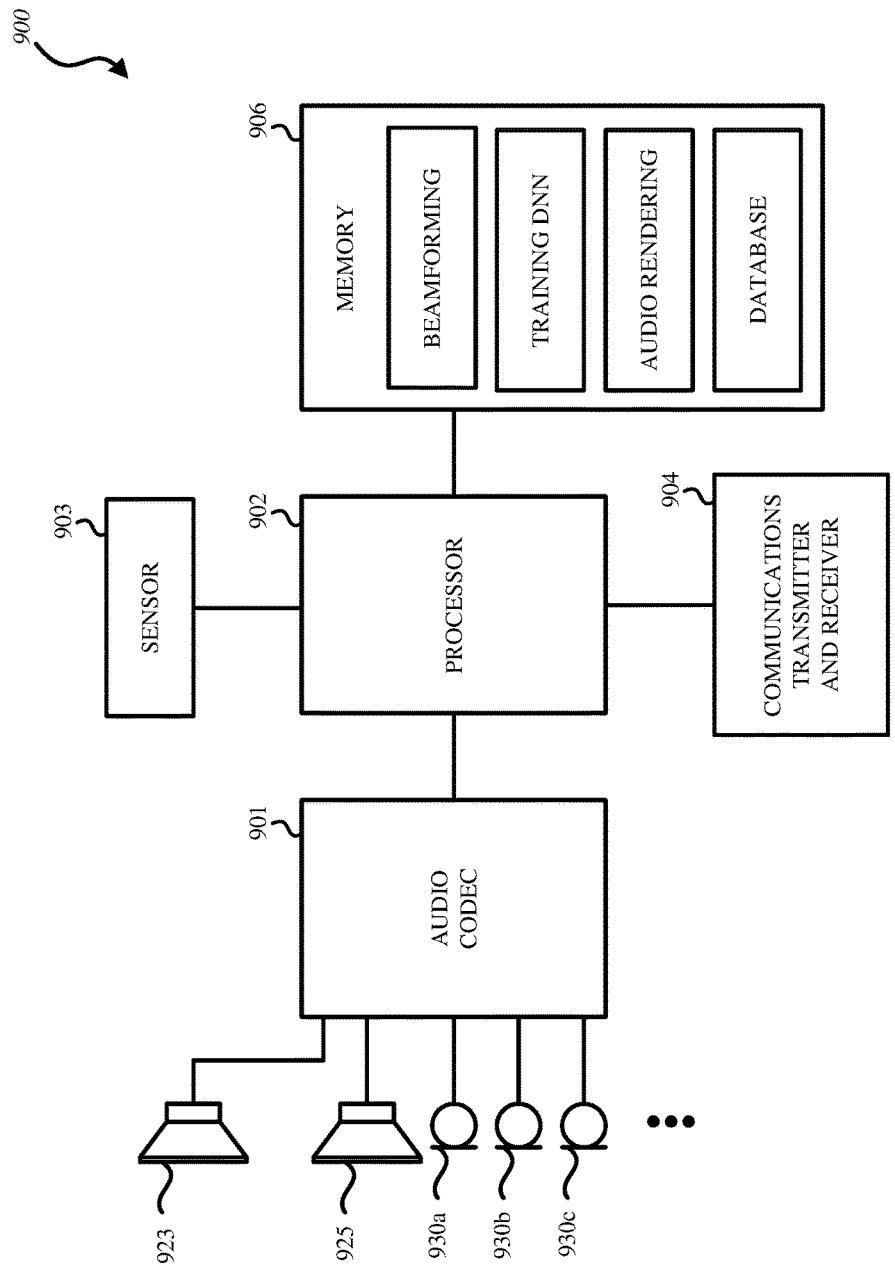
FIG. 9 illustrates an example for explaining one implementation of a portable device including a microphone array according to an example embodiment.

FIG. 9 is an example implementation 900 of the portable device described above, that has a programmed processor 902. In particular, device 900 is one example of the device 100 according to the example embodiment depicted in FIG. 1. The components shown may be integrated within a housing such as that of a mobile phone (e.g., see FIG. 2.) These include a number microphones 930 (930a, 930b, 930c, ... ) which may have a fixed geometrical relationship to each other and whose operating characteristics can be considered when configuring the processor 902 to act as a beamformer when the processor 902 accesses the microphone signals produced by the microphones 930, respectively. The microphone signals may be provided to the processor 902 and/or to a memory 906 (e.g., solid state non-volatile memory) for storage, in digital, discrete time format, by an audio codec 901. Microphones 930 may also have a fixed geometrical relationship to loudspeakers 923 and 925. A sensor 903 (e.g., still camera, video camera, accelerometer, etc.), provides information regarding the position and orientation of the portable device and to assist in repositioning of the device. Communications transmitter and receiver 904 facilitates communication with other devices.

The memory 906 has stored therein instructions that when executed by the processor 902 compute a configuration of, but not limited to, beamforming, training a DNN, audio rendering, and using a database. The instructions that program the processor 902 to perform all of the processes described above are all referenced in FIG. 9 as being stored in the memory 906 (labeled by their descriptive names, respectively.) These instructions may alternatively be those that program the processor 902 to perform the processes, or implement the components described above. Note that some of these circuit components, and their associated digital signal processes, may be alternatively implemented by hard-wired logic circuits (e.g., dedicated digital filter blocks, hardwired state machines.)

FIG. 9 is merely an example of particular implementations and is merely to illustrate the types of components that may be present in the audio system. While the system 900 is illustrated with various components of a data processing system, they are not intended to represent any particular architecture or manner of interconnecting the components; as such details are not germane to the embodiments herein. It will also be appreciated that network computers, handheld computers, mobile phones, servers, and/or other data processing systems which have fewer components or perhaps more components may also be used with the embodiments herein. Accordingly, the processes described herein are not limited to use with the hardware and software of FIG. 9.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio system may be performed by one or more programmable processors executing one or more computer programs stored on a non-transitory computer readable storage medium to perform the functions of the system. All or part of the audio system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain embodiments have been described and shown in the accompanying drawings, it is to be understood that such embodiments are merely illustrative of and not restrictive on the broad invention, and the invention is not limited to the specific constructions and arrangements shown and described, since various other modifications may occur to those of ordinary skill in the art. For example, it will be appreciated that aspects of the various embodiments may be practiced in combination with aspects of other embodiments. The description is thus to be regarded as illustrative instead of limiting.

The invention claimed is:

1. A method for performing machine based learning for sound field analysis for a device, the method comprising:
    measuring impulse responses of the device;
    generating a database of sound files by convolving source signals with the impulse responses of the device to produce the sound files;
    transforming the sound files from the database into time-frequency domain;
    estimating one or more sub-band directional features at each sub-band of the transformed sound files from the database in the time-frequency domain; and
    training a deep neural network (DNN) for each sub-band based on the estimated one or more sub-band directional features and a target directional feature.

2. The method of claim 1, wherein the one or more sub-band directional features include one or more of a Steered-Response Power Phase Transform (SRP-PHAT), inter microphone phases, and diffuseness.

3. The method of claim 1, wherein the DNN is trained with a single or multi-source audio signal utilizing real microphone array recordings, and wherein the target directional feature comprises a direction of arrival (DOA) of the single or multi-source audio signal.

4. The method of claim 1, wherein the DNN is trained with single and multi-source audio signals utilizing real microphone array recordings, and wherein the target directional feature comprises directions of arrival (DOAs) of the simultaneously active single and multi-source audio signals.

5. The method of claim 1, further comprising:
    defining alternative sound field descriptors as output classes of the DNN to learn sound field characteristics specific to hardware of interest per sub-band.

6. The method of claim 5, wherein the alternative sound field descriptors include one or more of diffuseness, inter-channel level differences (ILD) and inter-channel time differences (ITD) as a function of the angle.

7. The method of claim 5, further comprising:
    using deep learning of the alternative sound field descriptors as features to encode a captured audio signal from a hardware microphone array into a set of parameters.

8. The method of claim 1 further comprising:
    using the trained DNN to map a microphone signal to a loudspeaker or headphone signal for sound reproduction.

9. The method of claim 1, wherein the target directional feature includes one or more of class probabilities per quantized angle, XY coordinates and XYZ coordinates.

10. An audio system comprising:
    a processor;
    memory having stored therein instructions for performing machine based learning for sound field analysis for a device, the instructions when executed by the processor cause the processor to:
        measure impulse responses of the device;
        generate a database of sound files by convolving source signals with the impulse responses of the device to produce the sound files;
        transform the sound files from the database into time-frequency domain;
        estimate one or more sub-band directional features at each sub-band of the transformed sound files from the database in the time-frequency domain; and train a deep neural network (DNN) for each sub-band based on the estimated one or more sub-band directional features and a target directional feature.

11. The audio system of claim 10, wherein the one or more sub-band directional features include one or more of a Steered-Response Power Phase Transform (SRP-PHAT), inter microphone phases, and diffuseness.

12. The audio system of claim 10, wherein the DNN is trained with a single or multi-source audio signal utilizing real microphone array recordings, and wherein the target directional feature comprises a direction of arrival (DOA) of the single or multi-source audio signal.

13. The audio system of claim 10, wherein the DNN is trained with single and multi-source audio signals utilizing real microphone array recordings, and wherein the target directional feature comprises directions of arrival (DOAs) of the simultaneously active single and multi-source audio signals.

14. The audio system of claim 10, wherein the processor is further caused to: define alternative sound field descriptors as output classes of the DNN to learn sound field characteristics specific to hardware of interest per sub-band.

15. The audio system of claim 14, wherein the alternative sound field descriptors include one or more of diffuseness, inter-channel level differences (ILD) and inter-channel time differences (ITD) as a function of the angle.

16. The audio system of claim 14, wherein the processor is further caused to: use deep learning of the alternative sound field descriptors as features to encode a captured audio signal from a hardware microphone array into a set of parameters.

17. The audio system of claim 10, wherein the processor is further caused to:
use the trained DNN to map a microphone signal to a loudspeaker or headphone signal for sound reproduction.

18. The audio system of claim 10, wherein the target directional feature includes one or more of class probabilities per quantized angle, XY coordinates and XYZ coordinates.

19. A non-transitory computer-readable storage medium storing executable program instructions for performing machine based learning for sound field analysis for a device, the program instructions when executed by a processor cause the processor to perform a method comprising:
measuring impulse responses of the device;
generating a database of sound files by convolving source signals with the impulse responses of the device to produce the sound files;
transforming the sound files from the database into time-frequency domain;
estimating one or more sub-band directional features at each sub-band of the transformed sound files from the database in the time-frequency domain; and
training a deep neural network (DNN) for each sub-band based on the estimated one or more sub-band directional features and a target directional feature.

20. The non-transitory computer-readable storage medium according to claim 19, wherein the one or more sub-band directional features include one or more of a Steered-Response Power Phase Transform (SRP-PHAT), inter microphone phases, and diffuseness.

21. The non-transitory computer-readable storage medium according to claim 19, wherein the DNN is trained with a single or multi-source audio signal utilizing real microphone array recordings, and wherein the target directional feature comprises a direction of arrival (DOA) of the single or multi-source audio signal.

22. The non-transitory computer-readable storage medium according to claim 19, wherein the DNN is trained with single and multi-source audio signals utilizing real microphone array recordings, and wherein the target directional feature comprises directions of arrival (DOAs) of the simultaneously active single and multi-source audio signals.

23. The non-transitory computer-readable storage medium according to claim 19, further comprising:
defining alternative sound field descriptors as output classes of the DNN to learn sound field characteristics specific to hardware of interest per sub-band.

24. The non-transitory computer-readable storage medium according to claim 23, wherein the alternative sound field descriptors include one or more of diffuseness, inter-channel level differences (ILD) and inter-channel time differences (ITD) as a function of the angle.

25. The non-transitory computer-readable storage medium according to claim 23, further comprising:
using deep learning of the alternative sound field descriptors as features to encode a captured audio signal from a hardware microphone array into a set of parameters.

26. The non-transitory computer-readable storage medium according to claim 19, further comprising:
using the trained DNN to map a microphone signal to a loudspeaker or headphone signal for sound reproduction.

27. The non-transitory computer-readable storage medium according to claim 19, wherein the target directional feature includes one or more of class probabilities per quantized angle, XY coordinates and XYZ coordinates.

* * * * *